R. M. FRANKLIN.
NET FRAME.
APPLICATION FILED SEPT. 11, 1916.
1,291,469.
Patented Jan. 14, 1919.
2 SHEETS—SHEET 1.
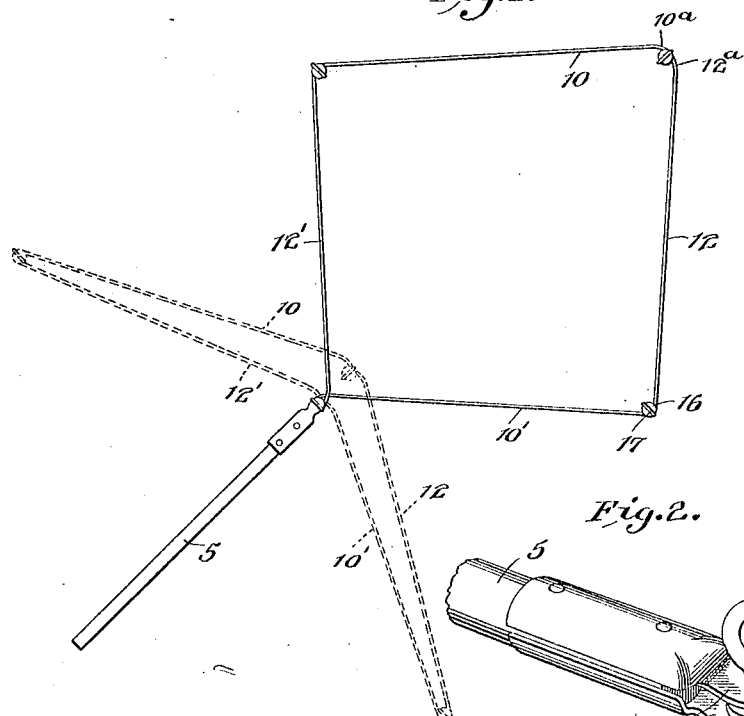
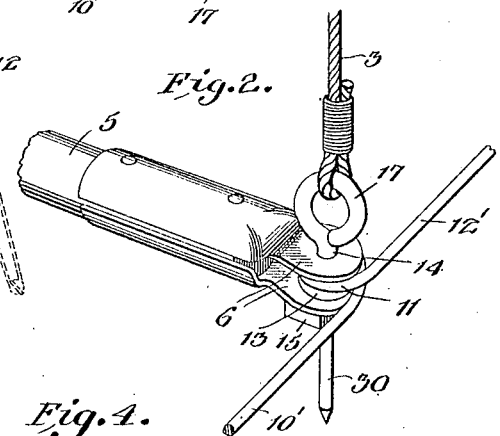
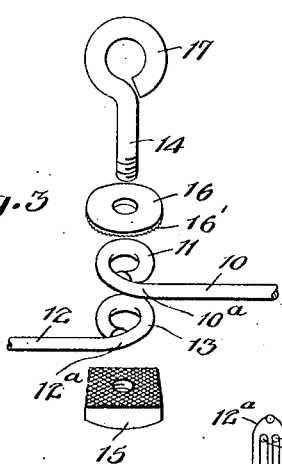
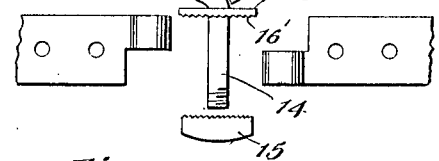
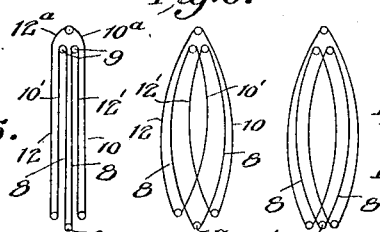
Inventor
Robert M. Franklin
Attorneys R. M. FRANKLIN.
NET FRAME.
APPLICATION FILED SEPT. 11, 1916.
1,291,469.
Patented Jan. 14, 1919.
2 SHEETS—SHEET 2.
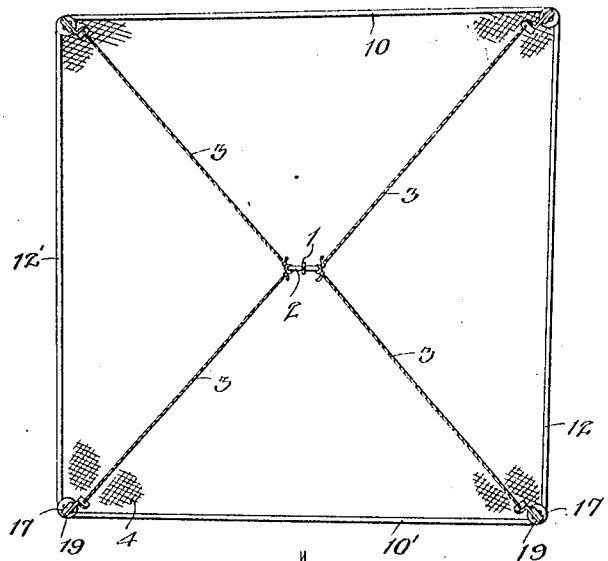
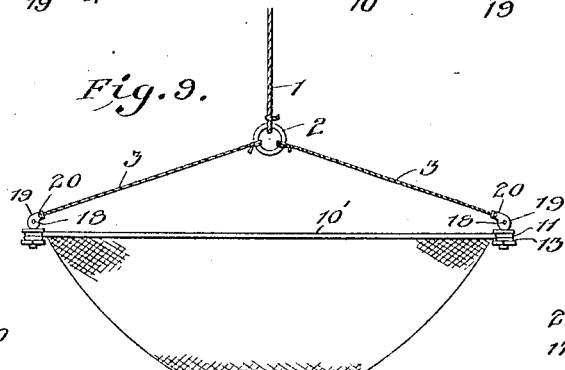
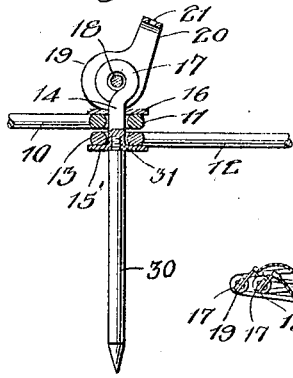
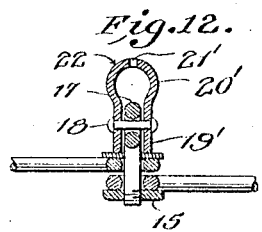
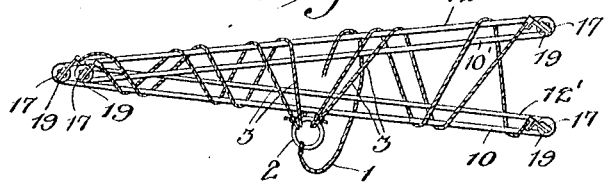
Inventor
Robert M. Franklin
By Mason Fenwick & Lawrence,
Attorneys

UNITED STATES PATENT OFFICE.

ROBERT M. FRANKLIN, OF GALVESTON, TEXAS.

NET-FRAME.

1,291,469.   Specification of Letters Patent.   Patented Jan. 14, 1919.

Application filed September 11, 1916.   Serial No. 119,557.

*To all whom it may concern:*

Be it known that I, ROBERT M. FRANKLIN, a citizen of the United States, residing at Galveston, in the county of Galveston and State of Texas, have invented certain new and useful Improvements in Net-Frames; and I do hereby declare the following to be a full, clear, and exact description of the invention, such as will enable others skilled in the art to which it appertains to make and use the same.

This invention relates to fishing, and more especially to nets; and one object of the same is to produce a net frame which may be folded into small compass as for storage or transfer or may be distended and locked in that position. Another object is to attach a support to one or more corners of the net frame, which support may be a cord or cords, or a handle, or both. Still another object is to provide means for preventing the net from being moved along the bottom by the current or the undertow.

The invention consists in making the frame of an even number of side bars, two of which are longer than the others so as to facilitate folding, pivotally connecting these bars where they meet at the corners or angles of the frame, providing a clamp which is a part of each pivot or applied thereto and by means of which the pivotal action is temporarily interrupted, attaching the handle or the bail cords to such pivots, and carrying the shank of one of the pivots downward into a pin—all as hereinafter more fully described and claimed and as shown in the drawings wherein:

Figure 1 is a plan view of an open dip net whose frame is constructed in accordance with this invention and has a handle at one corner, and the frame is shown in dotted lines as partly closed; and Fig. 2 is a perspective detail of the inner end of the handle with its ferrule, this view showing how a bail cord may also be attached to the eye-bolt.

Fig. 3 is an enlarged perspective detail of the parts of one joint separated.

Fig. 4 is an elevation of the meeting ends of two side bars which in this case are metal straps, the parts being slightly separated.

Figs. 5, 6 and 7 are diagrams of six-sided nets folded.

Fig. 8 is a plan view of a drop net whose frame is distended, Fig. 9 is a side elevation thereof, and Fig. 10 a plan view with the parts folded.

Figs. 11 and 12 are enlarged sections through one of the joints at right angles to each other, the joints in the net shown on this sheet of drawings including an eccentric cam.

The side bars of this net frame may be of wood, with the parts at its corners of metal, they may be metallic straps standing on edge and perforated for the attachment of the net as best seen in Fig. 4, or they may and probably will be heavy wires or light rods, preferably galvanized so as to prevent rust and usually four in number, although six are shown in Figs. 5, 6 and 7. The joints at the several corners of the frame are practically duplicates, and each is perhaps best seen in Fig. 3 wherein the numeral 10 designates one side bar having at its end an eye 11, and the numeral 12 the next side bar having at its end an eye 13 underlying and registering with the eye 11. Through these two eyes is passed the shank 14 of an eye-bolt which may have at its lower end an integral head as seen at 15' in Fig. 11 or a nut 15 as seen in Figs. 3 and 12. Above the uppermost eye 11 the shank passes through a washer or more particularly a clamping plate 16 preferably roughened or provided with teeth as shown at 16' (and similar teeth may also be provided on the nut), and the upper end of the shank is formed into an eye 17. When the nut is held and the eye-bolt turned by grasping its eye between the thumb and finger, or when the eye is held and the nut is turned, the washer or clamping plate 16 is forced down onto the upper eye which in turn is forced down onto the lower eye and that in turn is forced down onto the nut 15 (or the head 15' as seen in Fig. 11) with the result that the two eyes are clamped in close contact. When this clamping action is not present, the eyes serve as knuckles of a hinge joint between the side bars, and the shank of the eye-bolt serves as the pintle thereof. Care should be taken with a four-sided frame that the eyes bend inward on all bars excepting at one corner, and the exception is to enable the frame to be folded as will be explained. The two bars 10' and 12' next the point where the eyes are bent outward are of a given length, and the remaining bars 10 and 12 are slightly longer. Also the longer bars at their ends remote from the out-turned eyes are bowed or arched slightly outward as at 10ª and 12ª. When now it is desired to fold a four-sided frame of this character, the pivot between the bowed ends of the bars 10 and 12 is pressed inward toward the opposite pivot. This turns the parts to the position shown in dotted lines in Fig. 1, and subsequently the shorter bars 10' and 12' may be folded together and the longer bars 10 and 12 may be folded around them, whether said bars are of rods or of strap iron. I do not wish to be limited, however, to a four-sided frame, as it is quite possible that a larger number of side bars than four could be employed, though I would preferably always have an even number. Also while these bars are preferably straight except for the arched ends of the longer pair, it might be possible to curve them all slightly and employ perhaps six of them so that the distended frame would be substantially circular in contour. Such a frame is shown in diagram in Fig. 6 as folded, the bars 8 of the third pair being pivotally connected with each other at 7 and with the shorter bars at 9; and the bars 8' of Fig. 7 are of the same length as the shorter bars 10' and 12' and all of them of less length than the longer bars 10 and 12. In Fig. 5 all the bars are straight, but the longer bars have the arches 10ª and 12ª referred to above. From these diagrammatic views it will be clear that if one pair of bars is longer than the others or at least longer than the next adjacent pair, it will inclose them when the parts are folded.

The support for this net will depend to a certain extent upon the uses to which it is to be put. The cords for a drop net will be described below. An ordinary dip net may well be manipulated by means of a handle 5, to which is attached a ferrule, and the ferrule is forked at its lower end, with its fork arms 6 flattened like washers and standing above and below the registering eyes 11 and 13—the uppermost arm thus serving as the washer or clamping plate 16. This ferrule joint may be used in Fig. 8 but is shown in detail only in Fig. 2, and I have made use of the last-named view to show how a cord 3 may lead from the eye 17 of the bolt in the ferrule joint. With one or more of such cords and means for drawing on them the net could be raised and lowered, and meanwhile the handle could be used for manipulating it; or the handle or cords might be omitted, and the net controlled entirely by the other form of support.

On Sheet 2 of the drawings is shown a construction wherein the clamp is made up of an element which is separate from the eye-bolt and which may be manipulated manually or automatically as shown. Through the eye 17 passes a rivet 18 which constitutes the pivot for an eccentric cam 19 whose head stands above the plate 16 as best seen in Figs. 11 and 12, and the arm 20 of this cam may have a handle for manual operation or an eye 21. The support is here shown as consisting of a main rope 1 with a ring 2, and from the latter bail cords 3 lead to the corners of the frame; and if the clamp is to act automatically these cords may well be attached to the eyes 21 of the arms 20. Fig. 12 shows twin eccentrics 19' whose arms 20' are bowed upwardly and integrally united in a clevis 22, and the bail would be attached to the eye 21' in the top of this clevis. I consider it desirable that the high side of each eccentric be disposed toward the center of the net frame, and therefore when the same is opened up and the netting 4 allowed to fall, the weight thrown onto the bails causes them to draw inward on the arms 20 and rotate the eccentric cams 19' on their pivots 18. The result is that the high sides or cam faces of the eccentrics bear downward on the plates 16 with the clamping action above described.

I have found by experience that when crabbing with a drop net the current often lifts the net off the bottom, and as weights are something of a nuisance I have provided means on this improved net for preventing such lifting by practically anchoring the net in place. This is best seen in Fig. 11. It consists in projecting one of the eye-bolts into a pin 30 two or three inches long, more or less. With this amplification, the force of the current on the net will cause this pin to drag and finally hang onto the bottom and counteract the tendency of the net to move thereover and therefore to rise undesirably. The pin may be an integral part of the shank of the eye-bolt projected, although I have shown its upper end as detachably connected with said eye-bolt as by being screwed into the same as at 31. If detachably connected in this or any other way, it may be used or not as desired, and it may be removed entirely when the net is to be folded.

A fishing or crabbing net frame of this character may be folded as seen in Figs. 5, 6, 7 and 10, with the cords wrapped around it as shown in the last-named view if cords are employed as a support; whereas if the support be a handle, the net frame will fold alongside of it as will be understood from the dotted lines in Fig. 1, or the handle might be detached. The netting also will preferably be folded or wrapped around the side bars although of course it might be detached. To use the device the operator unfolds or distends the frame so that its side bars form substantially a square as seen in Figs. 1 and 8, or other geometric figure as will be understood, and the netting is so attached to the side bars that at this time its edge is taut while its center hangs as seen in Fig. 9. To hold the frame distended the clamps are now set up, and this may be done with the construction shown on Sheet 1 by holding the nuts and rotating the eyes of the eye-bolts, or it may be done with the construction shown on Sheet 2 by turning the cams manually, or perhaps by permitting the tension of the cords 3 to turn them as will be clear from Figs. 8 and 9. In any case the setting up of the clamps interrupts the pivotal action of the joints at the corners of the frame, and the latter thereafter maintains its distended condition while the net is being used. If cords alone are employed as a support, the device is a drop net and will be lowered and raised by means of rope 1; if the handle alone is employed as a support, the device is a dip net or a landing net; but it is obviously quite possible to raise and lower the net and its contents with the former support and meanwhile manipulate it with the latter, thus using both types. If the net is to be let down onto the bottom, the pin 30 may be employed at the proper corner, and if this pin is detachable as shown at 31 in Fig. 11 it may be applied and removed at will.

After using the net the clamps at the corners are loosened by a reversal of the operation, the frame is again folded, the support may be removed although I preferably leave it in place as has been suggested, the netting is wrapped around the folded frame, and the entire device may then be transported or stored within small space. Thus is produced a net whose frame is made up of side bars connected at its corners by joints, and clamping means are provided to tighten said joints so as to interrupt their pivotal action at will, a support of proper character to correspond to the uses to which the device is to be made, and anchoring means if the net is to be employed on the bottom.

What I claim is:

1. In a folding net, the combination with a frame consisting of a set of side bars having eyes at their extremities overlapping each other in pairs, and a net connected to said bars; of pivot pins passing through the pairs of eyes, clamping means for pressing the eyes into holding contact to prevent relative turning after the frame has been expanded, and a suspension bail connected to said clamping means.

2. A net frame comprising a relatively longer pair of bars, each having inturned eyes at both extremities, a relatively shorter pair of bars each having an inturned eye at one extremity and an out-turned eye at the other, the out-turned eyes overlapping each other, the inturned eyes overlapping two on the longer bars, and the remaining two eyes on said longer bars overlapping each other, and pivot pins through all overlapping eyes.

3. A net frame comprising a relatively longer pair of bars, each having inturned eyes at both extremities, a relatively shorter pair of bars each having an inturned eye at one extremity and an out-turned eye at the other, the out-turned eyes overlapping each other, the inturned eyes overlapping two on the longer bars, and the remaining two eyes on said longer bars overlapping each other, and eye-bolts through all overlapping bars; combined with a support connected with the eye-bolt through the out-turned eyes.

4. A folding net comprising a set of rigid side bars each having eyes at its ends, adjustable clamping means hingedly connecting each pair of overlapped eyes of said bars at each joint of the frame base and permitting the latter to be folded or expanded and then locked, and a support connected to said clamping means.

5. In a folding net, the combination with a frame made up of side bars having eyes at their extremities overlapping each other in pairs; of pivot pins each having its shank passing downward through one pair of eyes and headed beneath the lower eye, a washer on said shank above the upper eye, and a clamp pivoted to the upper end of the pin and adapted to be moved to depress said washer, for the purpose set forth.

6. In a folding net, the combination with a frame made up of side bars having eyes at their extremities overlapping each other in pairs; of eye-bolts each having its shank passing downward through one pair of said eyes and headed beneath the lowermost, a washer on its shank above the upper eye, a rivet through the eye of the washer, and an eccentric cam pivoted on said rivet with its active edge contacting with said washer, for the purpose set forth.

7. A fishing net comprising a plurality of bars collapsible into a compact folded position, the ends of the side bars each having apertures and the ends of the adjacent bars being overlapped and their apertures alined, and clamping means, at each pivot of the frame, including eye-bolts passing through each pair of alined apertures at the ends of the bars to which a support may be attached.

8. A fishing net comprising a jointed frame including a plurality of side bars, the ends of which are provided with eyes and overlapped in pairs, and clamping means connecting each of the pairs of eyes to form pivots about which the frame may be collapsed, and having eyes adapted for the connection of a support.

9. In a folding net, the combination with a frame made up of side bars having eyes at their extremities overlapping each other in pairs; of pivot pins each having its shank passing downward through one pair of eyes for permitting them to turn on each other, and clamping means for pressing said eyes into contact to prevent such turning.

In testimony whereof I affix my signature in presence of two witnesses.

ROBERT M. FRANKLIN.

Witnesses:
SYDNEY J. WEBSTER,
J. N. CHILDRESS.

Copies of this patent may be obtained for five cents each, by addressing the "Commissioner of Patents, Washington, D. C."